Patented Oct. 30, 1934

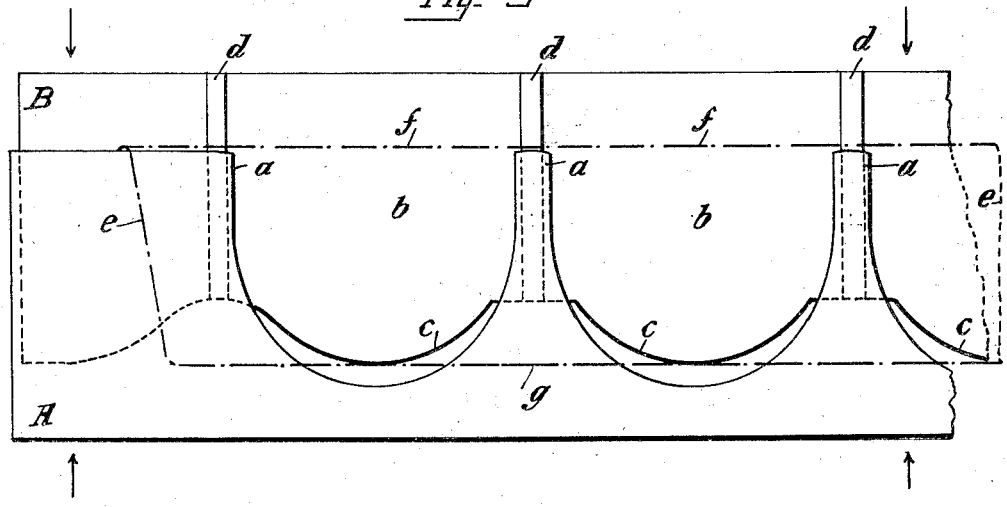
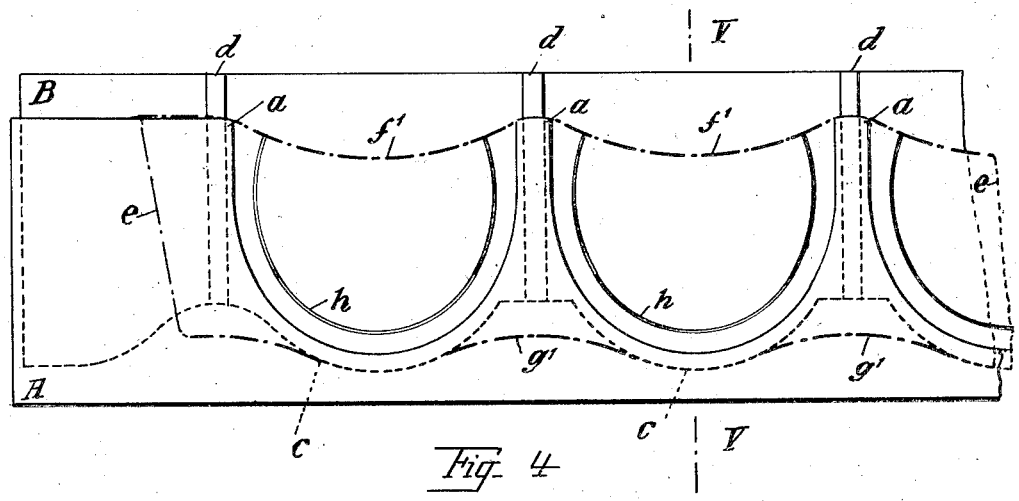

1,978,542

UNITED STATES PATENT OFFICE 1,978,542

APPARATUS FOR MAKING OF SEAMLESS DRESS PRESERVERS

Robert Langer, Vienna, Austria, assignor to the firm Leopold Pollenz, Vienna, Austria Application December 21, 1929, Serial No. 415,776
In Austria January 16, 1929

2 Claims. (Cl. 18—34)

This invention relates to an apparatus for the manufacture of seamless dress preservers made of a material which is impregnated or coated with rubber.

The apparatus hitherto known and used for the manufacture of seamless dress preservers in which the material which is impregnated or coated with rubber is twisted or strained have suffered from several disadvantages chief among which may be mentioned that creases and other irregularities are formed, more particularly at the bow-shaped or curved edge of the piece of material and that the material and the impregnation of the material (or the impermeable layer placed over the same) is detrimentally affected, more particularly at the curved edge. These disadvantages are caused by reason of the mould pieces which are used in the previous processes and by means of which the material is shaped coming into direct contact with the material at all points, or at least into direct contact with the curved edge which is the most sensitive part, so that the material is subjected to the direct mechanical as well as thermal effects of the mould pieces and suffers injurious modifications at the points of contact and may even be partially destroyed.

The object of the present invention is, therefore, to avoid the direct effect of the shaping mould pieces on those parts of the material which eventually form the seamless dress preserver and according thereto the direct contact of the mould pieces is confined to those parts of the material which in the finishing off of the dress preserver are cut away and discarded.

In manufacturing seamless dress preservers by means of mould pieces according to this invention spaces are left between the mould pieces when they are moved toward each other in which the portions of the material which eventually form the dress preserver are subjected to contortion and to subsequent treatment, without coming into contact with the mould pieces themselves, and that the mould pieces contact with points of the material which lie outside of the dress preserver which is to be manufactured. Mould pieces of this kind render it further possible to work up the path of the material along its entire width uniformly and without any previous cutting out or taking to pieces.

Figure 1:
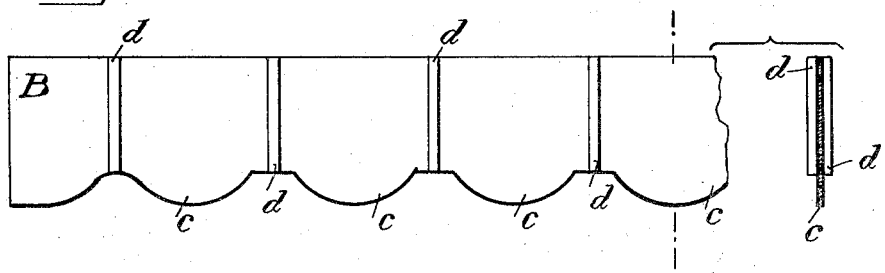
Figure 2:
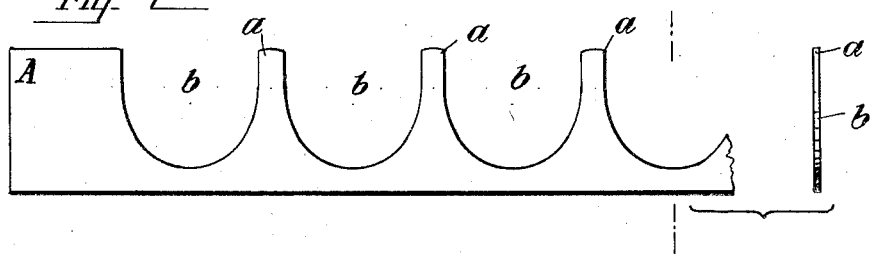
Figure 5:
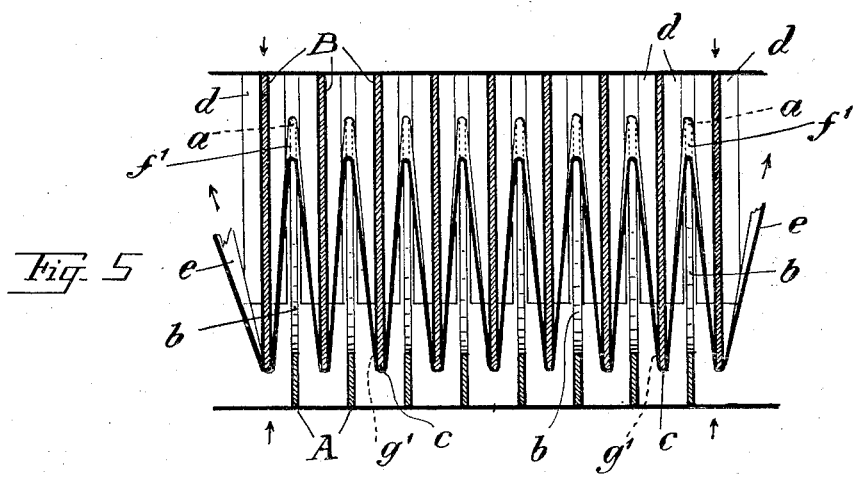

The apparatus for carrying out the process according to this invention are shown diagrammatically in the accompanying drawings. Figures 1 and 2 are views of the mould pieces. Figure 3 shows the mutual position of the mould pieces themselves and their position with regard to the material before the contortion, and Figure 4 shows the same after the contortion. Figure 5 is a section on line 5—5 of Figure 4.

The apparatus in accordance with the present invention comprises two kinds of members A and B as mould pieces for the material. The member A has comparatively narrow projections $a$ which are separated from one another by spaces $b$ the width of each of which somewhat exceeds that of the piece of material constituting a dress preserver. The member B has suitably convex projections $c$ which are distributed corresponding to the centre lines of the spaces $b$ of the member A, and is provided on both sides with spacer pieces $d$ or the like which are arranged between the projections $c$ and project from its side surfaces and are arranged to register with the projections $a$.

For the purpose of manufacturing the seamless dress preservers the material $e$ which is impregnated or covered with rubber is laid along the whole of its width alternately in folds around the connecting line of the projections $a$ or $c$ (Figure 3) and then, the ends of the path of the material being firmly held, the members A and B are pushed toward each other (Figure 4), whereby the material experiences a contortion.

The position of the members A and B with regard to each other and to the material before as well as after the contortion, as also the alteration in the shape of the material due to the contortion can be seen in Figures 3 to 5. The fold curves $f$, $g$ of the material run previously to the contortion in a straight line over the projections $a$ or the projections $b$ and, owing to the contortion of the material, they are converted into flexures which partly follow the course of these projections themselves and take up a course between the projections, somewhat like that shown by the dot and dash lines $f^1$ and $g^1$ (Fig. 4). Owing to the distribution of the projections on the two kinds of members A, B and of the spacer pieces $d$, free spaces are formed between the members B in which appears the flexure of the fold curve $f$, a flexure which corresponds to the arm-pit curvature of a dress preserver, and that portion of the material destined for both of the pieces of material constituting the dress preserver is also contorted into the shape of the piece of material, without the members or any other heated parts of the device coming into contact with the portions of material remaining on the finished dress preserver. Vulcanizing gases during the process must be enabled to act upon the material. For this reason there must be provided between each pair of mould members B, notwithstanding the presence of the interposed member A, chambers each of which is sufficiently large to receive one dress preserver. The spaces $b$ of member A thus serve not only to prevent contact between the fold or crease $f'$ and the mould members, but also to form in connection with the spacer pieces $d$ the chambers or compartments shown in Figure 5. It is therefore an easy matter to obtain from this portion of material which has been contorted into the shape of a dress preserver, say by punching out along the double line $h$, dress preservers the material of which was prevented from coming into any harmful contact with mould pieces and the like during the contorting process, so that the durability and the appearance of the finished dress preserver are in every respect equal to that of the initial material.

I claim—

1. Apparatus for the production of seamless dress preservers, comprising a member having mould pieces arranged in spaced relation to each other and provided with spacer members on their opposing sides and having convex lower edge surfaces forming projections between said spacer members and a second member having a mould piece for arrangement between the first named mould pieces and having recesses open at its upper edge corresponding approximately to the size and shape of the dress preservers to be produced so that material between the mould pieces will be arranged in contact with the projection edges of the first named mould pieces and the projections between the spaces of the second named mould piece so that when the mould pieces are moved toward each other the material will be stretched between them and localized portions thereof contorted to the required size and shape of the desired dress preserver and the spaces in the second member will afford access of vulcanizing gases to the contorted material.

2. Apparatus for the production of seamless dress preservers, comprising a member having mould pieces arranged in spaced relation to each other and provided with spacer members on their opposing sides and having convex lower edge surfaces forming projections between said spacer members and a second member having a mould piece for arrangement between the first named mould pieces and having recesses open at its upper edge corresponding aproximately to the size and shape of the dress preservers to be produced so that material between the mould piece will be arranged in contact only with the projection edges of the first named mould pieces and the projections between the spaces of the second named mould piece so that when the mould pieces are moved toward each other the material will be stretched between them and the localized portions thereof out of direct contact with the projections of the said mould pieces contorted to the required size and shape of the desired dress preserver and the spaces in the second member will afford access of vulcanizing gases to the contorted material.

ROBERT LANGER.